United States Patent
Baick

(10) Patent No.: US 11,297,384 B2
(45) Date of Patent: Apr. 5, 2022

(54) METHOD, SYSTEM, AND NON-TRANSITORY COMPUTER-READABLE RECORD MEDIUM FOR CREATING VIDEO BASED ON USER-FEEDBACKABLE BOTS

(71) Applicant: LINE Plus Corporation, Seongnam-si (KR)

(72) Inventor: Joonsick Baick, Seongnam-si (KR)

(73) Assignee: LINE PLUS CORPORATION, Gyeonggi-do (KR)

(*) Notice: Subject to any disclaimer, the term of this patent is extended or adjusted under 35 U.S.C. 154(b) by 10 days.

(21) Appl. No.: 17/014,243

(22) Filed: Sep. 8, 2020

(65) Prior Publication Data
US 2020/0404368 A1 Dec. 24, 2020

Related U.S. Application Data

(63) Continuation of application No. PCT/KR2018/002833, filed on Mar. 9, 2018.

(51) Int. Cl.
*H04N 21/44* (2011.01)
*H04L 12/58* (2006.01)
*H04L 51/02* (2022.01)
*H04L 51/10* (2022.01)

(52) U.S. Cl.
CPC ...... *H04N 21/44016* (2013.01); *H04L 51/02* (2013.01); *H04L 51/10* (2013.01)

(58) Field of Classification Search
CPC .... H04N 21/44016; H04L 51/02; H04L 51/10
See application file for complete search history.

(56) References Cited

U.S. PATENT DOCUMENTS

2018/0367484 A1* 12/2018 Rodriguez ........... G06Q 10/101

FOREIGN PATENT DOCUMENTS

| JP | 2012-147288 A | 8/2012 |
|---|---|---|
| JP | 2016-501468 A | 1/2016 |
| JP | 2017-010536 A | 12/2017 |
| KR | 10-2002-0074304 S | 9/2002 |
| KR | 10-2004-0022503 A | 3/2004 |
| KR | 10-2004-0107858 A | 12/2004 |
| KR | 10-2012-0075510 A | 7/2012 |
| KR | 10-2014-0047491 A | 4/2014 |
| KR | 10-2015-0068509 A | 6/2015 |
| WO | WO-2015/064903 A1 | 5/2015 |

OTHER PUBLICATIONS

International Search Report dated Dec. 10, 2018 issued in International Application No. PCT/KR2018/002833.
Japanese Office Action dated Feb. 1, 2022 issued in corresponding Japanese Patent Application No. 2020-547122.

* cited by examiner

*Primary Examiner* — Sumaiya A Chowdhury
(74) *Attorney, Agent, or Firm* — Harness, Dickey & Pierce, P.L.C.

(57) ABSTRACT

Disclosed are methods, systems, and/or a non-transitory computer-readable record mediums for producing a video based on a bot enabling a user feedback. A video production method may include receiving a plurality of images uploaded to a chatroom in response to a bot for a video production being added to the chatroom and the chatroom including at least one user, creating at least one primary video clip using at least two images among the plurality of images, creating a single video using the at least one primary video clip, and providing the created single video to the chatroom.

22 Claims, 11 Drawing Sheets

METHOD, SYSTEM, AND NON-TRANSITORY COMPUTER-READABLE RECORD MEDIUM FOR CREATING VIDEO BASED ON USER-FEEDBACKABLE BOTS

CROSS-REFERENCE TO RELATED APPLICATIONS

This U.S. non-provisional application is a continuation application of, and claims the benefit of priority under 35 U.S.C. § 365(c) from International Application PCT/KR2018/002833, which has an International filing date of Mar. 9, 2018, the disclosure of each of which are incorporated herein by reference in their entirety.

BACKGROUND

Technical Field

One or more example embodiments relate to technology for producing a single video using a plurality of images.

Related Art

In general, an instant messenger is used as a useful method to deliver information in real time using the Internet. Such an instant messenger is intended to deliver simple messages between users in real time, and may allow two users to talk in real time through texts as if the two users were talking face to face.

Such a messenger client program provides a function of transmitting emoticon, flashcon, gifticon, etc., to a chat partner through a messenger chatroom or a function of transmitting a file, such as an image, a video, and a document using a chatroom, as well as a simple function of delivering a message.

Also, the messenger client program provides a group chat function of making a one-to-one chat and making a group chat through a single chatroom. For a group chat, it is possible to add a conversation partner in a chatroom created or opened by selecting a plurality of chat partners and requesting the selected chat partners for a chat in the messenger client program.

Such a messenger function is popular in a mobile environment of a mobile communication terminal as well as a personal computer (PC).

Currently, the messenger service provides various types of extended services beyond a simple chat function.

SUMMARY

Some example embodiments may provide a chat production function in a chatbot form that is easy and convenient in a messenger chatroom.

Some example embodiments may produce a single video by adding a bot with a video production function to a chatroom and by automatically editing a plurality of images through the bot.

Some example embodiments may provide a chat production environment allowing users included in a corresponding chatroom to collaborate through interaction in the chatroom.

Some example embodiments may provide a natural interaction and a quick response speed using a video clip created in advance within a video production process.

Some example embodiments may create in advance a video clip to which a transition effect is applied, may use the video clip to produce a video, and accordingly, may provide a quick result.

Some example embodiments may easily and quickly perform a modification, for example, add, delete, and replace, using a previously created video clip.

According to an aspect of at least one example embodiment, a video production method implemented by a computer system including at least one processor configured to execute computer-readable instructions included in a memory may include, receiving, by the at least one processor, a plurality of images uploaded to a chatroom in response to a bot for video production being added to the chatroom and the chatroom including at least one user, creating, by the at least one processor, at least one primary video clip using at least two images among the plurality of images, creating, by the at least one processor, a single video using the at least one primary video clip, and providing, by the at least one processor, the created single video to the chatroom.

A number of the plurality of images may correspond to a number of images input as a video production option through the chatroom.

The receiving may include receiving the plurality of images according to a video production rule for the chatroom.

The method may further include determining the video production rule based on a number of images uploaded within a desired period of time from a point in time at which the bot is added to the chatroom or a number of images before or after the bot is added to the chatroom.

The receiving may include receiving a video production option including at least one of a number of images for video production, an image-by-image playing time, and an image orientation through the chatroom.

The creating the at least one primary video clip may include creating a video clip by sequentially connecting a desired number of images, with respect to the at least two images.

The creating the at least one primary video clip may further include providing a transition effect between the images included in the at least one primary video clip.

The providing may include providing the created single video and a dashboard that includes an image list including the at least two images used to create the created single video.

The video production method may further include receiving, by the least one processor, a modification request for performing at least one of (1) addition of a new image, and (2) deletion, duplication, and replacement of at least one of the at least two images used to create the video based on the dashboard.

The dashboard may include information about a configuration and an order of the at least two images used to create the created single video.

The video production method may further include creating, by the at least one processor, at least one secondary video clip in response to receiving a modification request for modifying the created single video from the chatroom, and creating, by the at least one processor, a modified video using at least one of the at least one secondary video clip created in response to the modification request and the at least one primary video clip, in response to the modification request.

According to an aspect of at least one example embodiment, there is provided a non-transitory computer-readable record medium storing instructions that, when executed by the at least one processor, cause the at least one processor to perform the aforementioned video production method.

According to an aspect of at least one example embodiment, a computer system including a memory, and at least one processor configured to connect to the memory and to execute computer-readable instructions included in the memory may be provided. The at least one processor may be configured to receive a plurality of images uploaded to a chatroom in response to a bot for video production being added to the chatroom and the chatroom including at least one user, create at least one primary video clip using at least two images among the plurality of images, create a single video using the at least one primary video clip, and provide the created single video to the chatroom.

DETAILED DESCRIPTION

Figure 1:
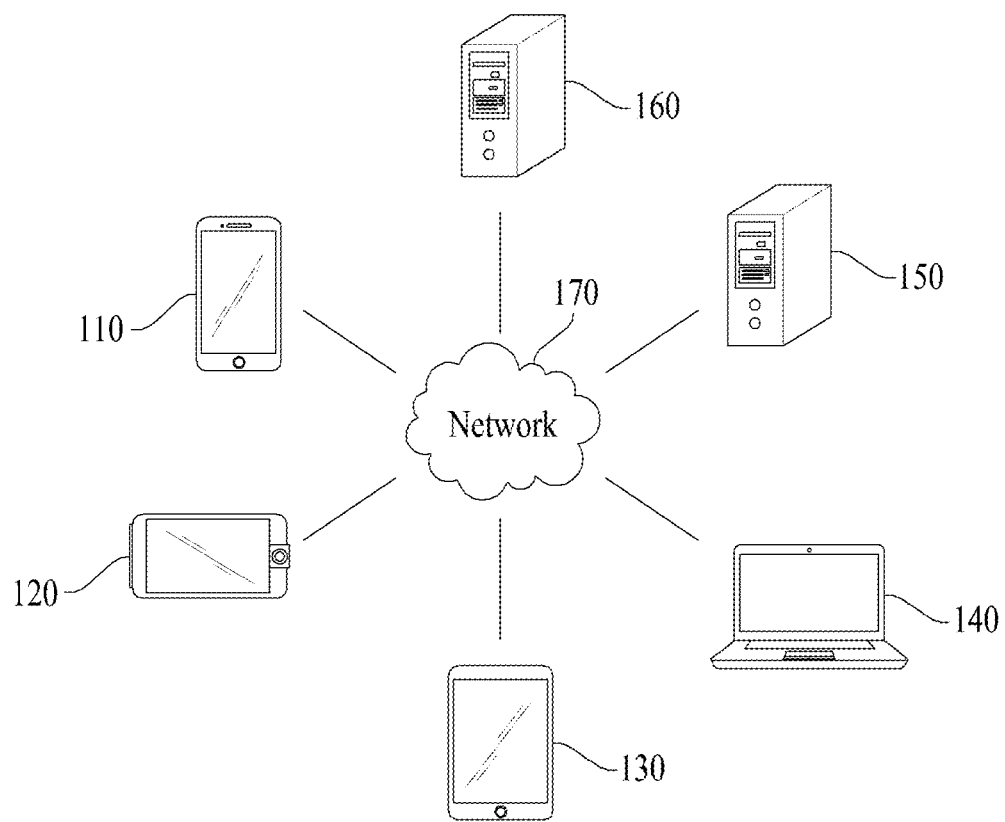
FIG. 1 is a diagram illustrating an example of a network environment according to at least one example embodiment.

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments will be described with reference to the accompanying drawings.

The example embodiments relate to technology for producing a single video using a plurality of images.

The example embodiments including disclosures herein may provide a video production function in a chatbot form in a messenger chatroom and accordingly, may achieve many advantages in terms of usability, speed, efficiency, convenience, and cost saving.

FIG. 1 illustrates an example of a network environment according to at least one example embodiment. Referring to FIG. 1, the network environment may include a plurality of electronic devices 110, 120, 130, and 140, a plurality of servers 150 and 160, and a network 170. FIG. 1 is provided as an example only. A number of electronic devices or a number of servers is not limited thereto.

Each of the plurality of electronic devices 110, 120, 130, and 140 may be a fixed terminal or a mobile terminal that is configured as a computer system. The plurality of electronic devices 110, 120, 130, and 140 may be, for example, a smartphone, a mobile phone, a navigation device, a computer, a laptop computer, a digital broadcasting terminal, a personal digital assistant (PDA), a portable multimedia player (PMP), a tablet PC, a game console, a wearable device, an Internet of things (IoT) device, a virtual reality (VR) device, an augmented reality (AR) device, and the like. For example, although FIG. 1 illustrates a shape of a smartphone as an example of the electronic device 110, the electronic device 110 used herein may refer to one of various types of physical computer systems capable of communicating with other electronic devices 120, 130, and 140, and/or the servers 150 and 160 over the network 170 in a wireless or wired communication manner.

The communication scheme is not limited and may include a near field wireless communication scheme between devices as well as a communication scheme using a communication network (e.g., a mobile communication network, wired Internet, wireless Internet, a broadcasting network, a satellite network, etc.) includable in the network 170. For example, the network 170 may include at least one of network topologies that include a personal area network (PAN), a local area network (LAN), a campus area network (CAN), a metropolitan area network (MAN), a wide area network (WAN), a broadband network (BBN), and Internet. Also, the network 170 may include at least one of network topologies that include a bus network, a star network, a ring network, a mesh network, a star-bus network, a tree or hierarchical network, and the like. However, they are provided as examples only.

Each of the servers 150 and 160 may be configured as a computer apparatus or a plurality of computer apparatuses that provides an instruction, a code, a file, content, a service, etc., through communication with the plurality of electronic devices 110, 120, 130, and 140 over the network 170. For example, the server 150 may be a system that provides a first service to the plurality of electronic devices 110, 120, 130, and 140 connected over the network 170 and the server 160 may be a system that provides a second service to the plurality of electronic devices 110, 120, 130, and 140 connected over the network 170. In detail, for example, the server 150 may provide, as the first service, a service, for example, a messenger service, intended by an application through the application as a computer program installed and executed on the plurality of electronic devices 110, 120, 130, and 140. As another example, the server 160 may provide, as the second service, a service that distributes a file for installing and executing the application to the plurality of electronic devices 110, 120, 130, and 140.

Figure 2:
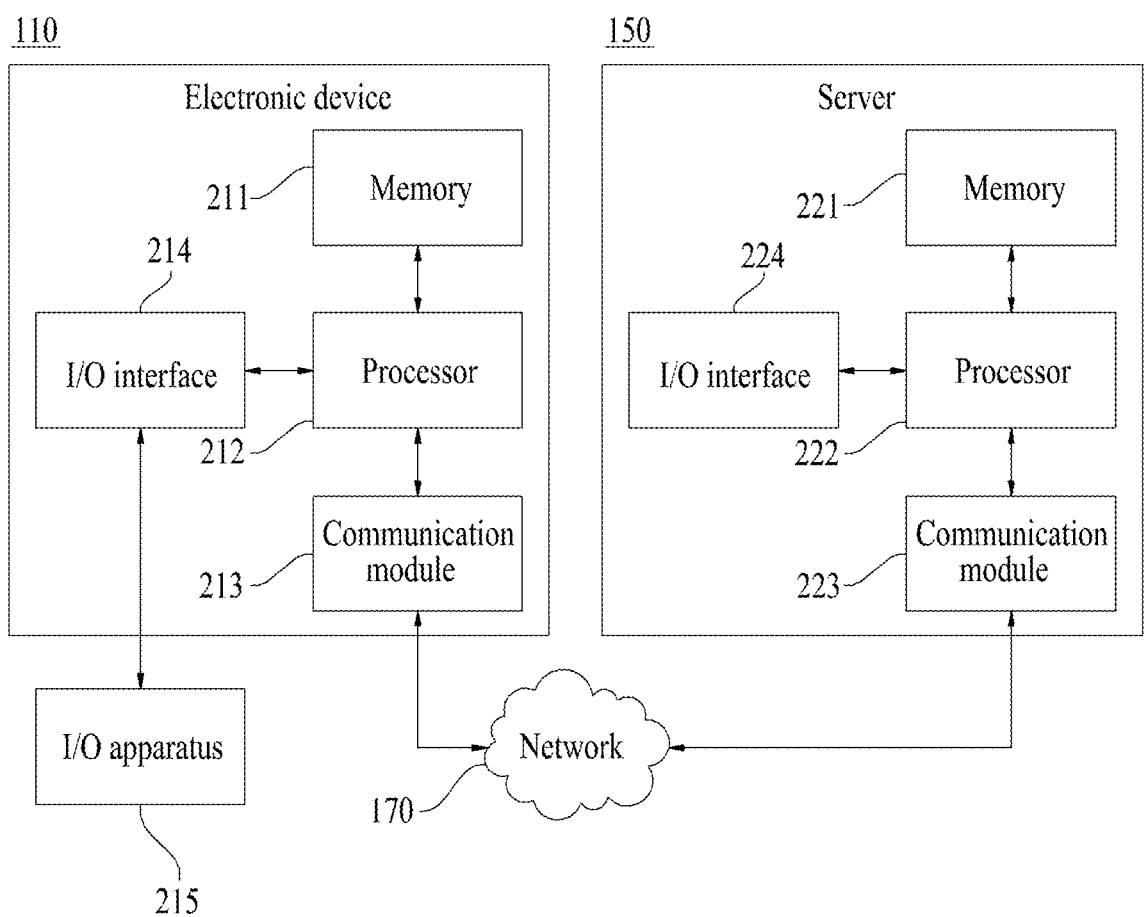
FIG. 2 is a diagram illustrating an example of an electronic device and a server according to at least one example embodiment.

FIG. 2 is a diagram illustrating an example of an electronic device and a server according to at least one example embodiment. Description is made using the electronic device 110 as an example of an electronic device and the server 150 as an example of a server with reference to FIG. 2. Also, the other electronic devices 120, 130, and 140 or the server 160 may have the same or similar configuration as that of the electronic device 110 or the server 150.

Referring to FIG. 2, the electronic device 110 may include a memory 211, a processor 212, a communication module 213, and an input/output (I/O) interface 214, and the server 150 may include a memory 221, a processor 222, a communication module 223, and an I/O interface 224. The memory 211, 221 may include a permanent mass storage device, such as random access memory (RAM), a read only memory (ROM), a disk drive, a solid state drive (SSD), a flash memory, etc., as a non-transitory computer-readable record medium. The permanent mass storage device, such as ROM, SSD, flash memory, and disk drive, may be included in the electronic device 110 or the server 150 as a permanent storage device separate from the memory 211, 221. Also, an OS or at least one program code, for example, a code for a browser installed and executed on the electronic device 110 or an application installed and executed on the electronic device 110 to provide a specific service, may be stored in the memory 211, 221. Such software components may be loaded from another non-transitory computer-readable record medium separate from the memory 211, 221. The other non-transitory computer-readable record medium may include a non-transitory computer-readable record medium, for example, a floppy drive, a disk, a tape, a DVD/CD-ROM drive, a memory card, etc. According to other example embodiments, software components may be loaded to the memory 211, 221 through the communication module 213, 223, instead of the non-transitory computer-readable record medium. For example, at least one program may be loaded to the memory 211, 221 based on a computer program, for example, the application, installed by files provided over the network 170 from developers or a file distribution system, for example, the server 160, providing an installation file of the application.

The processor 212, 222 may be configured to process instructions of a computer program by performing basic arithmetic operations, logic operations, and I/O operations. The computer-readable instructions may be provided from the memory 211, 221 or the communication module 213, 223 to the processor 212, 222. For example, the processor 212, 222 may be configured to execute received instructions in response to the program code stored in the storage device, such as the memory 211, 221.

The communication module 213, 223 may provide a function for communication between the electronic device 110 and the server 150 over the network 170 and may provide a function for communication between the electronic device 110 and/or the server 150 with another electronic device, for example, the electronic device 120 or another server, for example, the server 160. For example, the processor 212 of the electronic device 110 may transfer a request created based on a program code stored in the storage device such as the memory 211, to the server 150 over the network 170 under control of the communication module 213. Inversely, a control signal, an instruction, content, a file, etc., provided under control of the processor 222 of the server 150 may be received at the electronic device 110 through the communication module 213 of the electronic device 110 by going through the communication module 223 and the network 170. For example, a control signal, an instruction, content, a file, etc., of the server 150 received through the communication module 213 may be transferred to the processor 212 or the memory 211, and content, a file, etc., may be stored in a storage medium, for example, the permanent storage device, further includable in the electronic device 110.

The I/O interface 214 may be a device used for interface with an I/O apparatus 215. For example, an input device may include a device, such as a keyboard, a mouse, a microphone, a camera, etc., and an output device may include a device, such as a display, a speaker, a haptic feedback device, etc. As another example, the I/O interface 214 may be a device for interface with an apparatus in which an input function and an output function are integrated into a single function, such as a touchscreen. The I/O apparatus 215 may be configured as a single device with the electronic device 110. Also, the I/O interface 224 of the server 150 may be a device for interface with an apparatus (not shown) for input or output that may be connected to the server 150 or included in the server 150. In detail, when the processor 212 of the electronic device 110 processes an instruction of a computer program loaded to the memory 211, content or a service screen configured based on data provided from the server 150 or the electronic device 120 may be displayed on the display through the I/O interface 214.

According to other example embodiments, the electronic device 110 and the server 150 may include a smaller or greater number of components than a number of components shown in FIG. 2. However, there is no need to clearly illustrate many components according to the related art. For example, the electronic device 110 may include at least a portion of the I/O apparatus 215, or may further include other components, for example, a transceiver, a global positioning system (GPS) module, a camera, a variety of sensors, a database (DB), and the like. In detail, if the electronic device 110 is a smartphone, the electronic device 110 may be configured to further include a variety of components, for example, an acceleration sensor, a gyro sensor, a camera module, various physical buttons, a button using a touch panel, an I/O port, a vibrator for vibration, etc., which are generally included in the smartphone.

Hereinafter, a method and system for producing a video based on a user-feedback-enabled bot in a messenger chatroom according to example embodiments is described.

Figure 3:
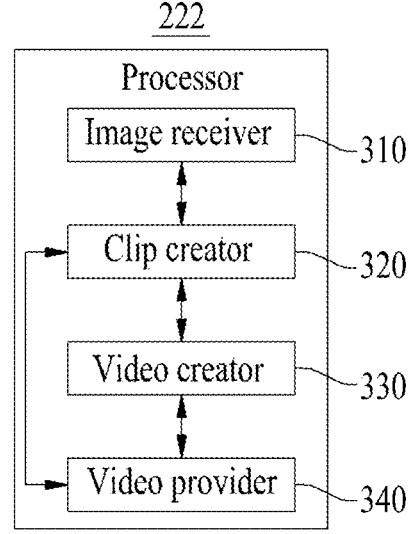
FIG. 3 is a diagram illustrating an example of components includable in a processor of a server according to at least one example embodiment.
Figure 4:
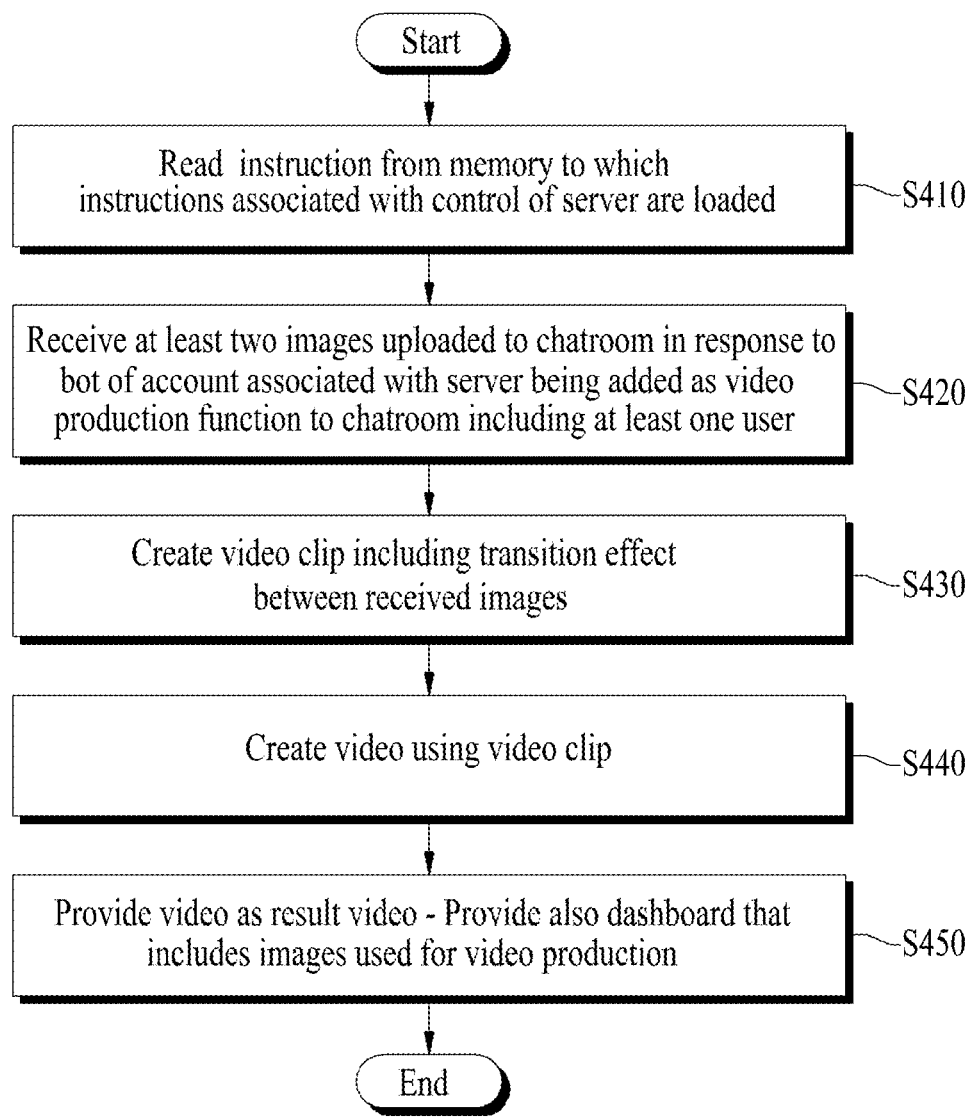
FIG. 4 is a flowchart illustrating an example of a method performed by a server according to at least one example embodiment.

FIG. 3 is a diagram illustrating an example of components includable in a processor of a server according to at least one example embodiment, and FIG. 4 is a flowchart illustrating an example of a method performed by a server according to at least one example embodiment.

The server 150 according to the example embodiment functions as a platform that provides a messenger service to the plurality of electronic devices 110, 120, 130, and 140 that are clients. For example, the server 150 may include a bot server capable of providing a video production function in a chatbot form within a messenger chatroom. The server 150 may provide a video production service through interaction with an application, that is, a messenger, installed on the electronic devices 110, 120, 130, and 140.

The server 150 may perform a video production method of FIG. 4 as a bot server. To this end, referring to FIG. 3, the processor 222 of the server 150 may include an image receiver 310, a clip creator 320, a video creator 330, and a video provider 340 as components. Depending on some example embodiments, the components of the processor 222 may be selectively included in or excluded from the processor 222. Also, depending on some example embodiments, the components of the processor 222 may be separated or merged for representations of functions of the processor 222.

The processor 222 and the components of the processor 222 may control the server 150 to perform operations S410 to S450 included in the video production method of FIG. 4. For example, the processor 222 and the components of the processor 222 may be configured to execute an instruction according to a code of at least one program and a code of an operating system (OS) included in the memory 221.

Here, the components of the processor 222 may be representations of different functions of the processor 222 performed by the processor 222 according to an instruction provided from a program code stored in the server 150. For example, the image receiver 310 may be used as a functional representation of the processor 222 that controls the server 150 to receive an image.

Referring to FIG. 4, in operation S410, the processor 222 may read an instruction from the memory 221 to which instructions associated with control of the server 150 are loaded. In this case, the read instruction may include an instruction for controlling the processor 222 to perform the following operations S420 to S450.

In operation S420, if a bot (hereinafter, also referred to as a "video production bot") of an account associated with the server 150 is added as a video production function to a chatroom including at least one user, the image receiver 310 may receive at least two images uploaded to the chatroom through the video production bot. In the chatroom that allows more than one user to exchange a chat with each other, any user may add the video production bot and may upload a desired image for video production. Here, once the video production bot is added to the chatroom, the image receiver 310 may receive an image uploaded to the corresponding chatroom. The user may add the video production bot to the chatroom and then may input a video production option, for example, a number of images for video production, an image-by-image playing time, an image orientation (landscape or portrait), a transition effect between images, and the like. The image receiver 310 may receive a corresponding number of images based on a number of images input as the video production option through the chatroom. As another example, the image receiver 310 may receive a total number of images or a desired (or alternatively, preset) number of images uploaded immediately after the video production bot is added or within a desired period of time (e.g., 30 seconds) after the video production bot is added. The image receiver 310 may receive an image based on a video production rule desired (or alternatively, predefined) for the chatroom. Here, the desired (or alternatively, predefined) video production rule may be determined based on a number of images uploaded within a desired period of time from a point in time at which the video production bot is added to the chatroom or a number of images uploaded before or after the video production bot is added to the chatroom. A plurality of users may simultaneously join video production by adding the video production bot to the chatroom including at least one user. Here, a corresponding user may add the video production bot to the chatroom and then may upload a desired image for video production. Here, an image used for video production may include a still image such as a photo and media such as a moving picture.

In operation S430, the clip creator 320 may create a video clip including a transition effect between images using images received from the chatroom. The transition effect relates to natural connection between images in a video production process. For example, the transition effect may include fade-in, fade-out, dissolve, swipe, and the like. The transition effect may be determined based on an option input from the user, a setting received from the user, or an instruction loaded to the memory 221 in association with control of the server 150. Here, a video transcoding process consuming a large amount of computation resources is used to apply the transition effect. The clip creator 320 may create in advance a video clip including the transition effect between images for effective video production. The clip creator 320 may create at least one primary video clip using at least two images among the plurality of images received from the chatroom. For example, the clip creator 320 may resize images received from the chatroom and may create a video clip in which a predetermined (alternatively, desired) number of resized images are sequentially connected. Here, a video clip that connects two images may apply the transition effect between images. If N images are received from the chatroom to produce a video including M images, the clip creator 320 may create in advance (M−1) video clips using M (N) images among the N images.

In operation S440, the video creator 330 may create a video using the at least one video clip created in operation S430. The video creator 330 may create a single video using the images received from the chatroom. Here, the video creator 330 may produce the entire video by connecting video clips produced in advance using the images received from the chatroom, that is, the video clips including the transition effect between images.

In operation S450, the video provider 340 may provide the video created in operation S440 as a result video with respect to the images received from the chatroom. That is, the video provider 340 may deliver the video produced using the images received from the chatroom to the corresponding chatroom. Here, the video provider 340 may provide the video created as the result video and, at the same time, may provide a chart (e.g., a dashboard) of images used to create the corresponding video to receive user feedback. The user may verify a configuration or order of images created as the video using the dashboard that includes the images used for the video production, and may modify, for example, add, delete, duplicate, replace, etc., an image included in the video. Accordingly, in response to a modification request (e.g., add, delete, duplicate, or replace) of an image, from the user through the chatroom based on the dashboard, the clip creator 320 may recreate at least one secondary video clip only with respect to the image corresponding to the modification request. Here, the video creator 330 may quickly create the result image according to the modification request by using the secondary video clip recreated in response to the modification request and by reusing the existing created primary video clip with respect to remaining images.

Therefore, the example embodiments provide a video production function in a chatbot form in a messenger chatroom such that a plurality of users may participate in producing a video, and particularly, may create a short clip using images for video production, thereby applying the transition effect that is not provided in an existing video production service and quickly providing a result video in response to a modification request from the user.

FIGS. 5 to 10 illustrate examples of a process of providing a video production service through a bot of a messenger according to at least one example embodiment.

Figure 5:
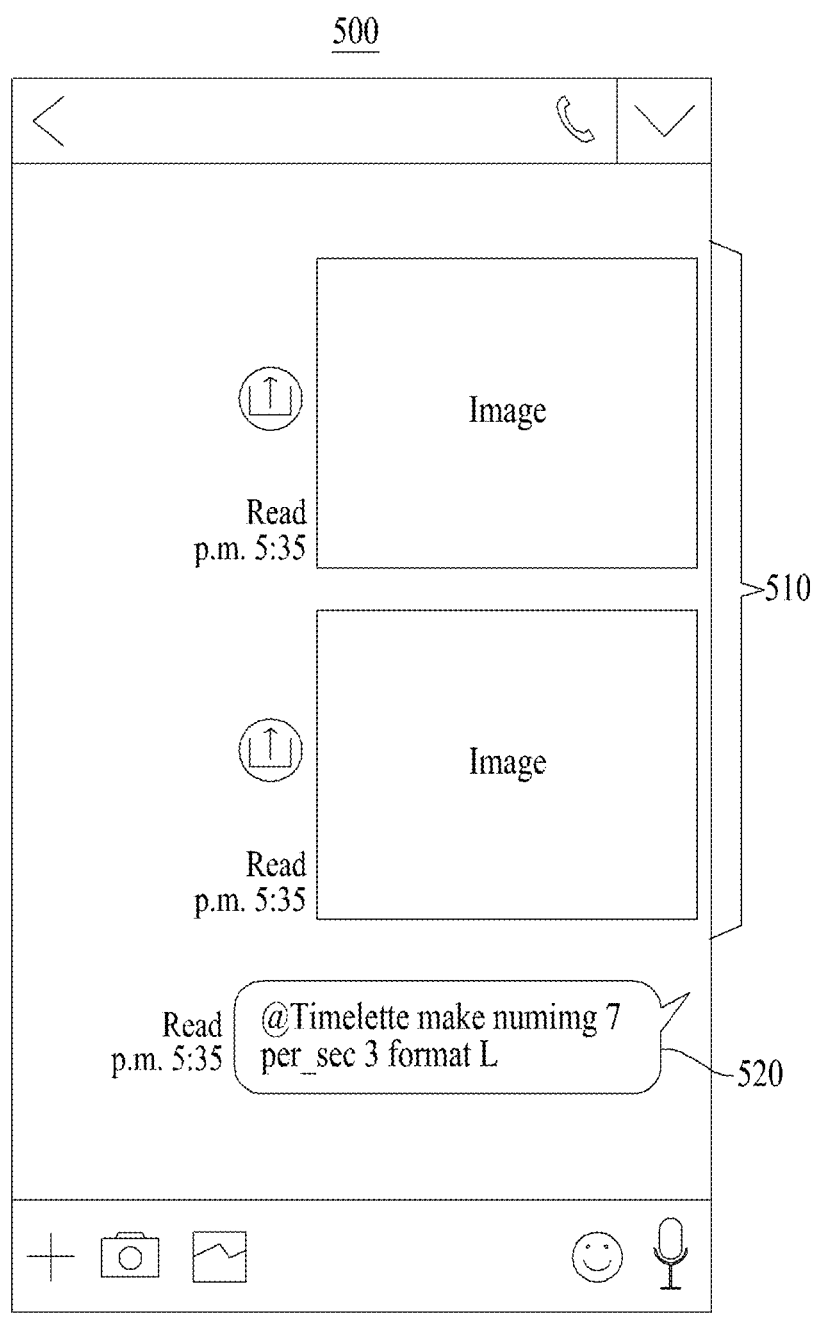
FIGS. 5 to 7 illustrate examples of a process of producing a video through a bot of a messenger according to at least one example embodiment.
Figure 6:
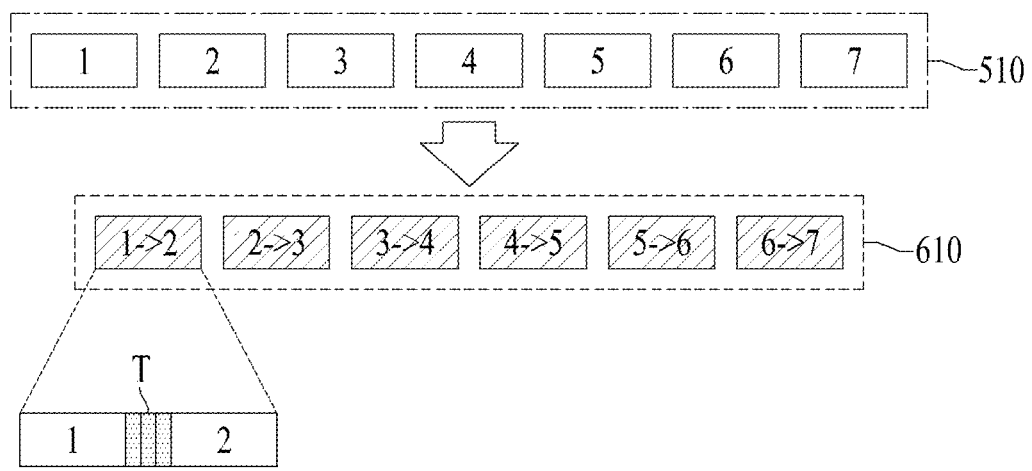

FIG. 5 illustrates an example of a messenger chatroom 500 displayed on a screen of the electronic device 110. The messenger chatroom 500 represents a chatroom in which at least one user participates and to which a video production bot is added.

The user of the electronic device 110 may upload images 510 for video production to the messenger chatroom 500 to which the video production bot is added, and may input a video production request 520 including a video production option. The user of the electronic device 110 may call the video production bot using a tag (e.g., '@Timelette') and then request the video production using a video production instruction (e.g., 'make'). Here, the user of the electronic device 110 may input, as the video production option, a number of images (e.g., 'numimg'), an image-by-image playing time (e.g., 'per_sec'), an image orientation (e.g., 'format': "L" if landscape, and "P" if portrait), and the like. For example, the user of the electronic device 110 may input the video production request 520 of "@Timelette make numimg 7 per_sec 3 format L" indicating "Timelette, please make a video that plays 3 seconds for each scene of 7 images and plays in a landscape format". Although not illustrated, the user of the electronic device 110 may receive the transition effect between images as the video production option.

The processor 222 of the server 150 may receive the images 510 for video production and the video production request 520 from the messenger chatroom 500, and may create a video corresponding to the video production request 520 using the received images 510, and then deliver the created video to the messenger chatroom 500. For example, referring to FIG. 6, the processor 222 of the server 150 may create video clips 610 to which the transition effect between images is applied in predetermined (or, alternatively, desired) order of the images 510 received from the messenger chatroom 500. Here, if the images 510 including seven images (e.g., images 1, 2, 3, 4, 5, 6, and 7) are received, the processor 222 of the server 150 may create a video clip 1→2 in which the images 1 and 2 are connected, a video clip 2→3 in which the images 2 and 3 are connected, a video clip 3→4 in which the images 3 and 4 are connected, a video clip 4→5 in which the images 4 and 5 are connected, a video clip 5→6 in which the images 5 and 6 are connected, and a video clip 6→7 in which the images 6 and 7 are connected. Here, each created video clip refers to a short clip image that includes two images, particularly, a clip image to which the transition effect T between two images is applied.

Figure 7:
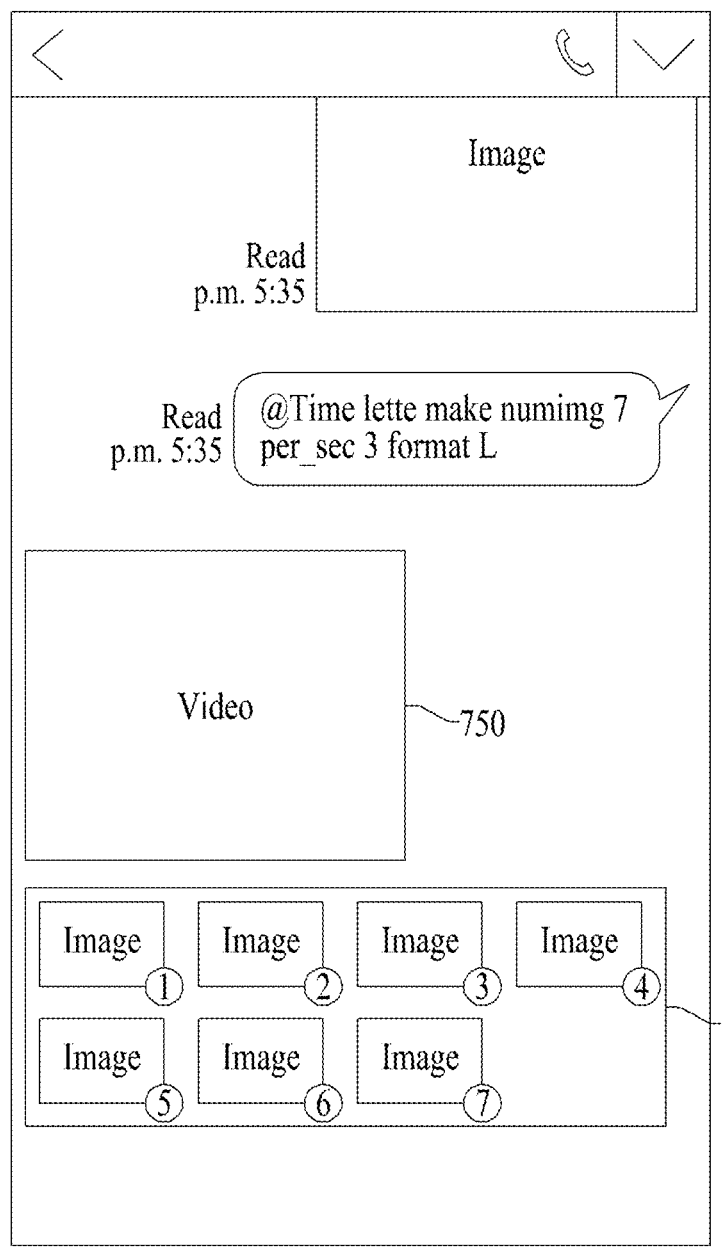

The processor 222 of the server 150 may create in advance the video clips 610 using the images 510 received from the messenger chatroom 500 and may create a result video that includes the entire images using the video clips 610. Referring to FIG. 7, the processor 222 of the server 150 may deliver, to the messenger chatroom 500, a video 750 that is a result video created in response to a video production request from the user of the electronic device 110, and may also provide a dashboard 760 that includes a list of images used to create the video 750.

The user of the electronic device 110 may verify the result video by playing the video 750 delivered to the messenger chatroom 500 and may verify a configuration or order of the images used to create the corresponding video 750 through the dashboard 760.

Users included in the messenger chatroom 500 may request a modification of the video 750, such as, for example, add, delete, duplicate, move (replace), etc., of an image, through the dashboard 760. For example, the user may input a modification request using an instruction, such as, 'add' for add, 'del' for delete, 'duplicate' for duplicate, and 'replace' for move (replace). The modification request for the video 750 may be input based on functions and rules as represented by the following Table 1.

TABLE 1

| | |
|---|---|
| Delete | #del 'index of an image to be deleted' |
| | delete_img(event) |
| Add | #add front 'reference photo index' 'index of a photo to be added' |
| | add_front_img(event) |
| | #add back 'reference photo index' 'index of a photo be added' |
| | add_back_img(event) |
| Duplicate | #duplicate front 'reference photo index' 'index of a photo to be duplicated' |
| | duplicate_front_img(event) |
| | #duplicate back 'reference photo index' 'index of a photo to be duplicated' |
| | duplicate_back_img(event) |
| Move (replace) | #replace 'reference photo index' 'index of a photo to be replaced' |
| | replace_img(event) |
| | #undo 'reference photo index' 'index of a photo to be replaced' |
| | undo_manifest(event) |
| | #redo 'reference photo index' 'index of a photo to be replaced' |
| | redo_manifest(event) |
| . . . | . . . |

Figure 8:
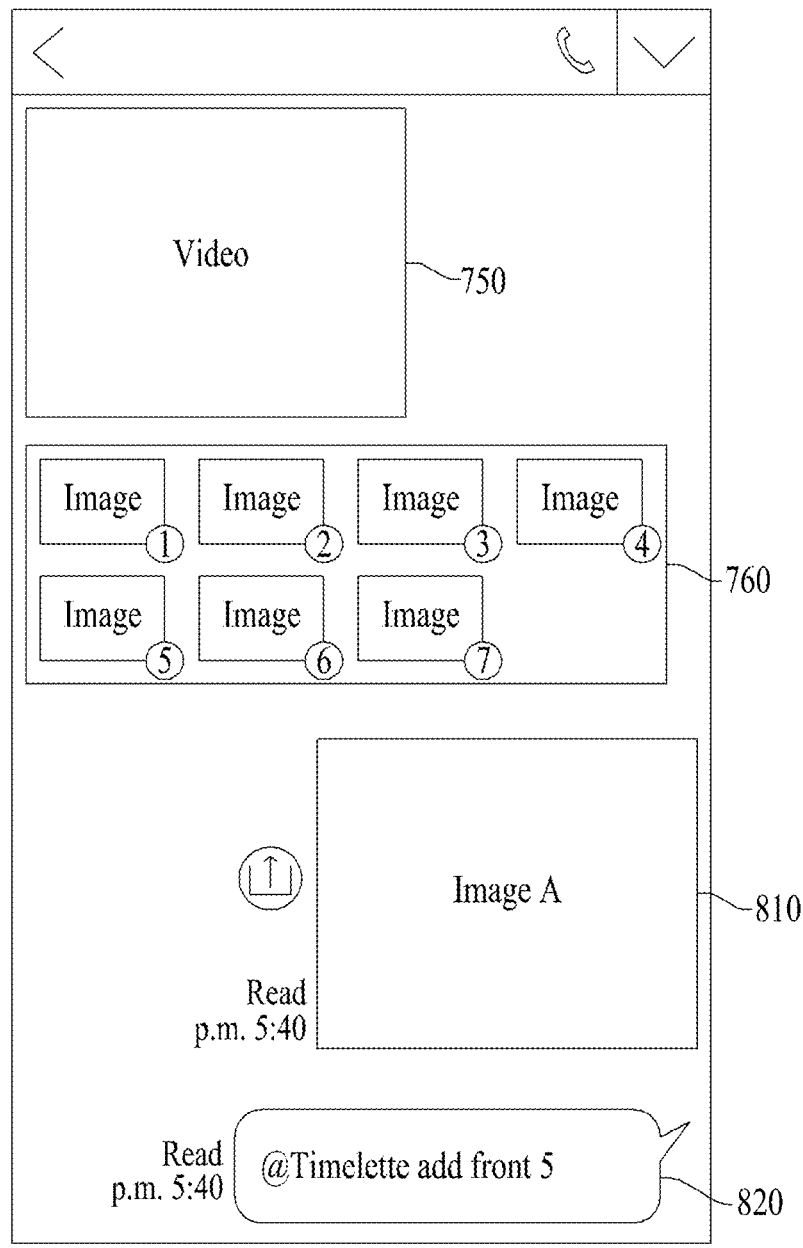
FIGS. 8 to 10 illustrate examples of a process of modifying a video produced through a bot of a messenger according to at least one example embodiment.

For example, referring to FIG. 8, if the user of the electronic device 110 desires to add an image to the video 750, the user may upload an image A 810 the user desires to add to the messenger chatroom 500 and may input a modification request 820 "@Timelette add front 5" representing "Timelette, please add it in front of image 5".

Figure 9:
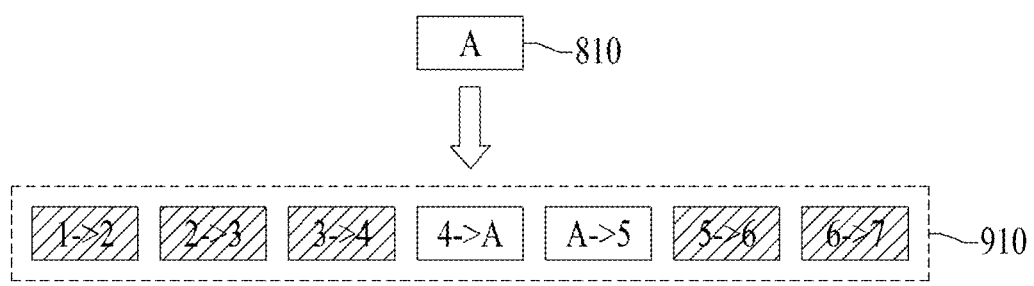

Referring to FIG. 9, the processor 222 of the server 150 may recreate video clips 910 including the image corresponding to the modification request using the previously created video clips 610 (e.g., the video clip 1→2, the video clip 2→3, the video clip 3→4, the video clip 4→5, the video clip 5→6, and the video clip 6→7). To add the image A 810 in front of the image 5, the processor 222 of the server 150 may newly create a video clip 4→A and a video clip A→5 and may use the remaining video clips 1→2, 2→3, 3→4, 5→6, and 6→7 as are.

Figure 10:
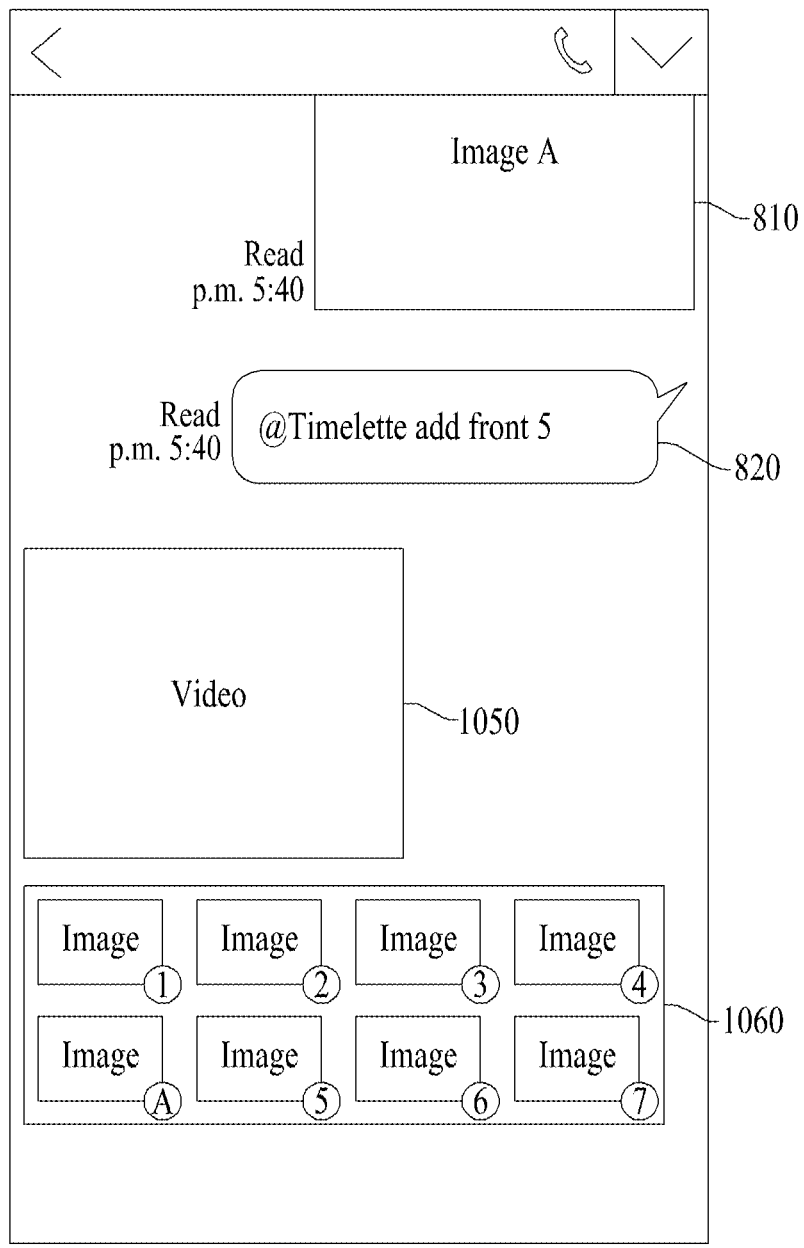

The processor 222 of the server 150 may create a new result video by using video clips recreated in response to the modification request 820 and by reusing the existing video clip with respect to remaining images. Referring to FIG. 10, the processor 222 of the server 150 may deliver, to the messenger chatroom 500, a modified video 1050 that is recreated by adding the image A 810 in response to the modification request 820 from the user, and may provide a dashboard 1060 that includes a list of images used to create the modified video 1050. Here, the dashboard 1060 may include information about a configuration or order of images including an added image, that is, the image A 810.

As described above, the processor 222 of the server 150 may produce a video using images uploaded to the messenger chatroom 500, and may deliver the video to the corresponding messenger chatroom 500. Here, the processor 222 may also provide a dashboard for modification, such as add, delete, duplicate, and replace, for images used to create the video, and may provide a result video relatively quickly by reusing some of the pre-created video clips for modification.

Figure 11:
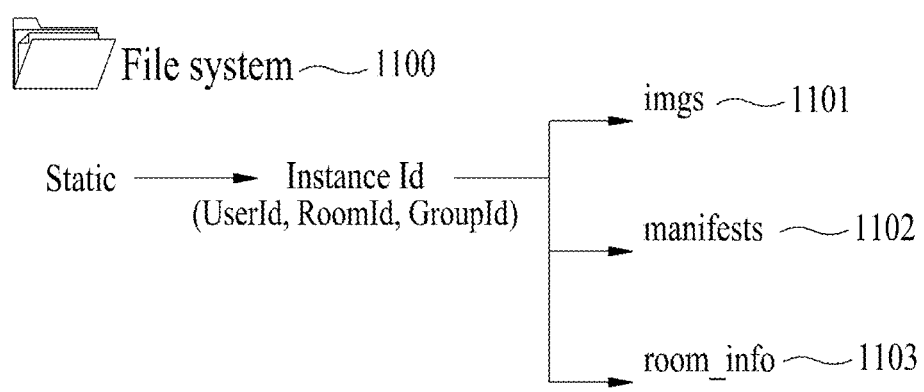
FIG. 11 illustrates an example of describing a file system for each chatroom according to at least one example embodiment.

Referring to FIG. 11, in the case of providing a video production function in a chatbot form within a messenger chatroom 500, the processor 222 of the server 150 may maintain a file system 1100 associated with a corresponding chatroom for each chatroom. The file system 1100 of each chatroom may include images (imgs) 1101 uploaded to a corresponding chatroom, and video production information (manifests) 1102 and (room_info) 1103 by a video production function. The images 1101 uploaded to the chatroom may include various types of media including images or videos (e.g., JPG and MP4). Here, for example, a data structure representing the video production information (manifests) 1102 and (room_info) 1103 may be represented by the following Table 2.

TABLE 2

| manifests (1102) | room_info (1103) |
|---|---|
| {"numimg" :(int) Number of media file to use "per_sec" : (int) Playing time of each scene "clip_info" :[ list of picked data indexs ]"all_data_name" :[ list of all data names]} | {"all_files" :[list of saved media file names]"num_manifest_files" :(int) the number of manifest files, "cur_manifest" :(int) an index of current used file"all_clips[dictionary of saved clip video]} |

The processor 222 of the server 150 may modify the video production information (manifests) 1102 and (room_info) 1103 stored in the file system 1100 in response to the modification request, for example, add, delete, replace, etc., of an image used for video production.

As described above, according to some example embodiments, it is possible to produce a video based on a user-feedback-enabled bot in a messenger chatroom. For example, because a video production function in a chatbot form is provided in a chatroom, all of users included in the chatroom may participate in video production. Further, according to some example embodiments, it is possible to apply a transition effect between images to a result video and to guarantee a fast response speed during a video production process by creating a video clip including the transition effect using images desired to be produced into a single video.

According to some example embodiments, a result image according to the modification request may be relatively quickly created by combining a secondary video clip created in response to the modification request with one or more pre-existing primary video clips with respect to remaining images. Thus, a video production server may use less computing resources and/or consume less power for creating a modified video (e.g., a result video) in response to the modification request because one or more portions of the modified video (e.g., the result video) corresponding to the one or more pre-existing primary video clips are reused without being recalculated.

The systems or apparatuses described above may be implemented using hardware components, software components, and/or a combination thereof. For example, the apparatuses and the components described herein may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors, distributed processors, a cloud computing configuration, etc. Moreover, each processor of the at least one processor may be a multi-core processor, but the example embodiments are not limited thereto.

The software may include a computer program, a piece of code, an instruction, or some combination thereof, for independently or collectively instructing or configuring the processing device to operate as desired. Software and/or data may be embodied permanently or temporarily in any type of machine, component, physical equipment, virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more computer readable storage mediums.

The methods according to the above-described example embodiments may be recorded in non-transitory computer-readable media including program instructions to implement various operations of the above-described example embodiments. The media may also include, alone or in combination with the program instructions, data files, data structures, and the like. The media may continuously store a program executable by a computer or may temporarily store or the program for execution or download. Also, the media may be various types of recording devices or storage devices in which a single piece or a plurality of pieces of hardware may be distributed over a network without being limited to a medium directly connected to a computer system. Examples of the media may include magnetic media such as hard disks, floppy disks, and magnetic tapes; optical media such as CD-ROM discs and DVDs; magneto-optical media such as floptical disks; and hardware devices that are specially configured to store and perform program instructions, such as read-only memory (ROM), random access memory (RAM), flash memory, and the like. Examples of other media may include recording media and storage media managed at Appstore that distributes applications or sites and servers that supply and distribute various types of software. Examples of program instructions include both machine code, such as produced by a compiler, and files containing higher level code that may be executed by the computer using an interpreter.

While this disclosure includes specific example embodiments, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents.

What is claimed is:

1. A video production method implemented by a computer system comprising at least one processor configured to execute computer-readable instructions included in a memory, the method comprising:
   receiving, by the at least one processor, a plurality of images uploaded to a chatroom in response to a bot for video production being added to the chatroom and the chatroom including at least one user;
   creating, by the at least one processor, at least one primary video clip using at least two images among the plurality of images;
   creating, by the at least one processor, a single video using the at least one primary video clip; and
   providing, by the at least one processor, the created single video to the chatroom.

2. The method of claim 1, wherein a number of the plurality of images corresponds to a number of images input as a video production option through the chatroom.

3. The method of claim 1, wherein the receiving comprises receiving the plurality of images according to a video production rule for the chatroom.

4. The method of claim 3, further comprising:
   determining the video production rule based on a number of images uploaded within a desired period of time from a point in time at which the bot is added to the chatroom or a number of images before or after the bot is added to the chatroom.

5. The method of claim 1, wherein the receiving comprises receiving a video production option including at least one of a number of images for video production, an image-by-image playing time, and an image orientation through the chatroom.

6. The method of claim 1, wherein the creating the at least one primary video clip comprises creating a video clip by sequentially connecting a desired number of images, with respect to the at least two images.

7. The method of claim 6, wherein the creating the at least one primary video clip further comprises providing a transition effect between the images included in the at least one primary video clip.

8. The method of claim 1, wherein the providing comprises providing the created single video and a dashboard that includes an image list including the at least two images used to create the created single video.

9. The method of claim 8, further comprising:
   receiving, by the at least one processor, a modification request for performing at least one of (1) addition of a new image and (2) deletion, duplication, or replacement of at least one of the at least two images used to create the single video based on the dashboard.

10. The method of claim 8, wherein the dashboard includes information about a configuration and an order of the at least two images used to create the created single video.

11. The method of claim 1, further comprising:
    creating, by the at least one processor, at least one secondary video clip in response to receiving a modification request for modifying the created single video from the chatroom; and
    creating, by the at least one processor a modified video using at least one of the at least one secondary video clip created in response to the modification request and the at least one primary video clip, in response to the modification request.

12. A non-transitory computer-readable record medium storing instructions that, when executed by the at least one processor, cause the at least one processor to perform the video production method of claim 1.

13. A computer system comprising:
    a memory; and
    at least one processor configured to connect to the memory and to execute computer-readable instructions included in the memory,
    wherein the at least one processor is configured to,
       receive a plurality of images uploaded to a chatroom in response to a bot for video production being added to the chatroom and the chatroom including at least one user,
       create at least one primary video clip using at least two images among the plurality of images,
       create a single video using the at least one primary video clip, and
       provide the created single video to the chatroom.

14. The computer system of claim 13, wherein the at least one processor is configured to receive the plurality of images such that a number of the plurality of images corresponds to a number of images input as a video production option through the chatroom.

15. The computer system of claim 13, wherein the at least one processor is further configured to receive the plurality of images according to a video production rule for the chatroom.

16. The computer system of claim 15, wherein the at least one processor is further configured to determine the video production rule is determined based on a number of images uploaded within a desired period of time from a point in time at which the bot is added to the chatroom or a number of images before or after the bot is added to the chatroom.

17. The computer system of claim 13, wherein the at least one processor is further configured to receive a video production option including at least one of a number of images for video production, an image-by-image playing time, and an image orientation through the chatroom.

18. The computer system of claim 13, wherein the at least one processor is further configured to create the at least one primary video clip by sequentially connecting a desired number of images with respect to the at least two images.

19. The computer system of claim 18, wherein the at least one processor is further configured to provide a transition effect between the images included in the at least one primary video clip.

20. The computer system of claim 13, wherein the at least one processor is further configured to provide the created single video and a dashboard that includes an image list including the at least two images used to create the single video.

21. The computer system of claim 20, wherein the dashboard includes information about a configuration and an order of the at least two images used to create the single video.

22. The computer system of claim 13, wherein:

the at least one processor is further configured to create at least one secondary video clip in response to receiving a modification request for modifying the created single video from the chatroom, and the at least one processor is further configured to create a modified video using at least one of the at least one secondary video clip created in response to the modification request and the at least one primary video clip, in response to the modification request.

* * * * *